United States Patent [19]

Hunter

[11] Patent Number: 4,539,212
[45] Date of Patent: Sep. 3, 1985

[54] STERILIZATION AND STABILIZATION PROCESS FOR MEAT ANALOG PRODUCTS

[75] Inventor: John E. Hunter, Cincinnati, Ohio

[73] Assignee: The Proctor & Gamble Company, Cincinnati, Ohio

[21] Appl. No.: 606,272

[22] Filed: May 7, 1984

Related U.S. Application Data

[63] Continuation-in-part of Ser. No. 500,699, Jun. 3, 1983, abandoned.

[51] Int. Cl.$^3$ .......................... A23B 4/12; A23L 3/16; A23L 3/34
[52] U.S. Cl. .................................. 426/325; 426/326; 426/332; 426/521
[58] Field of Search ............... 426/324, 325, 326, 335, 426/532, 589, 656, 399, 401, 521, 802, 332

[56] References Cited

U.S. PATENT DOCUMENTS

| | | |
|---|---|---|
| 3,399,064 | 8/1968 | Partyka et al. |
| 3,454,406 | 7/1969 | Alderton |
| 3,873,753 | 3/1975 | Nelson et al. ................... 426/518 X |
| 3,886,296 | 5/1975 | Brooks et al. ........................ 426/325 |
| 3,892,058 | 7/1975 | Komatsu et al. ............... 426/407 X |
| 3,961,083 | 6/1976 | Coleman ................................ 426/92 |
| 4,028,470 | 6/1977 | Hayashi et al. ................. 426/589 X |
| 4,168,328 | 9/1979 | Cheney et al. ................... 426/321 X |
| 4,241,095 | 12/1980 | Shibata et al. ...................... 426/335 |

FOREIGN PATENT DOCUMENTS 2921041  11/1979  Fed. Rep. of Germany ...... 426/407

OTHER PUBLICATIONS

Powers, J. J., "Effect of Acidification of Canned Tomatoes on Quality & Shelf Life", Critical Reviews in Food Science & Nutrition, pp. 371–396, Jun. 1976.
Schoenemann & Lopez, "Heat Processing Effects on Physical and Chemical Characteristics of Acidified Canned Tomatoes", Journal of Food Science, vol. 38, pp. 195–201 (1973).
Rice & Pederson, "Factors Influencing Growth of Bacillus Coagulans in Canned Tomato Juice. I. Acidic Constituents of Tomato Juice and Specific Organic Acids", Food Research, vol. 19, pp. 124–133 (1954).
Priestley, R. J., Effects of Heating on Foodstuffs, Applied Science Publishers, Lts., London, England, pp. 173–193, 199–208, 291–305 (1979).
York, G. K. et al., "Thermobacteriology of Canned Whole Peeled Tomatoes", Journal of Food Science, vol. 40, pp. 764–769 (1975).
Gould, W. A., Tomato Production, Processing and Quality Evaluation, AVI Publishing Co., Inc., Westport, CT, pp. 334–346 (1974).
Flaumenbaum, B. L. et al., "Calculation of Sterilization Conditions for Strained Tomatoes as a Function of the Thermostability of *Bacillus Coagulans* Spores", Konservnaya i Ovoshchesushil' naya Promyshlennost, No. 2, pp. 20–22 (1973).
Stumbo, C. R., Thermobacteriology in Food Processing, Academic Press, New York, N.Y., pp. 70–92, 106–120, 123–128, 129–151 (1973).
Laboratory Manual for Food Canners & Processors, vol. 1 (Microbiology and Processing), AVI Publ. Co., Inc., Westport, CT, pp. 166–251 (1968).
Anderson, E. E. et al., "Effects of Acids, Salt, Sugar, and Other Food Ingredients on Thermal Resistance of *Bacillus Thermoacidurans*", Food Research, vol. 14, pp. 499–510 (1949).

(List continued on next page.)

*Primary Examiner*—Arthur L. Corbin
*Attorney, Agent, or Firm*—Rose Ann Dabek; Gary M. Sutter; Richard C. Witte

[57] ABSTRACT

Food products containing high levels of meat or textured vegetable protein meat analog are sterilized without development of off-flavors in the meat or meat analog by a process including: (1) adjusting the pH to below about 4.6; (2) maintaining organic acid levels between about 0.4% and about 0.75% (expressed as anhydrous citric acid); (3) high temperature, short time processing of the food products; and (4) hot-fill-and-hold packing of the product in containers.

10 Claims, 1 Drawing Figure

OTHER PUBLICATIONS

Sognefest & Jackson, "Pre-Sterilization of Canned Tomato Juice", Food Technology, vol. 1, No. 1, pp. 78-84 (1947).

Wessel & Benjamin, "Process Control of Heat Resistant Spoilage Organisms in Tomato Juice", The Fruit Products Journal and American Vinegar Industry, pp. 178-180, 189, Feb. (1941).

National Canners Association Table on Hot-Fill-Hold-Cool Procedures for Various High Acid Products in California, Western Research Laboratories, Berkely, CA, Apr. (1966).

Andres, C., "Hot-Fill Shelf-Stable Liquid Products in Paperboard Containers", Food Processing, pp, 78-79, Mar. (1982).

21 C.F.R., §113, 114, §114.90.

Ashton et al., "Titratable Acidity as an Index of Microbiological Stability in Hot-Fill Acid Foods", Abstracts of the Annual Meeting of the American Society for Microbiology, Published in 1977.

Rice, A. C. & Pederson, C. A., "Chromatographic Analysis of Organic Acids in Canned Tomato Juice, Including the Identification of Pyrrolidonecarboxylic Acid", Food Research, vol. 19, pp. 106-114 (1954).

Snider, N., Soy Protein Recipe Ideas, Institutions/Volume Feeding Management Magazine, Chicago, IL (1971).

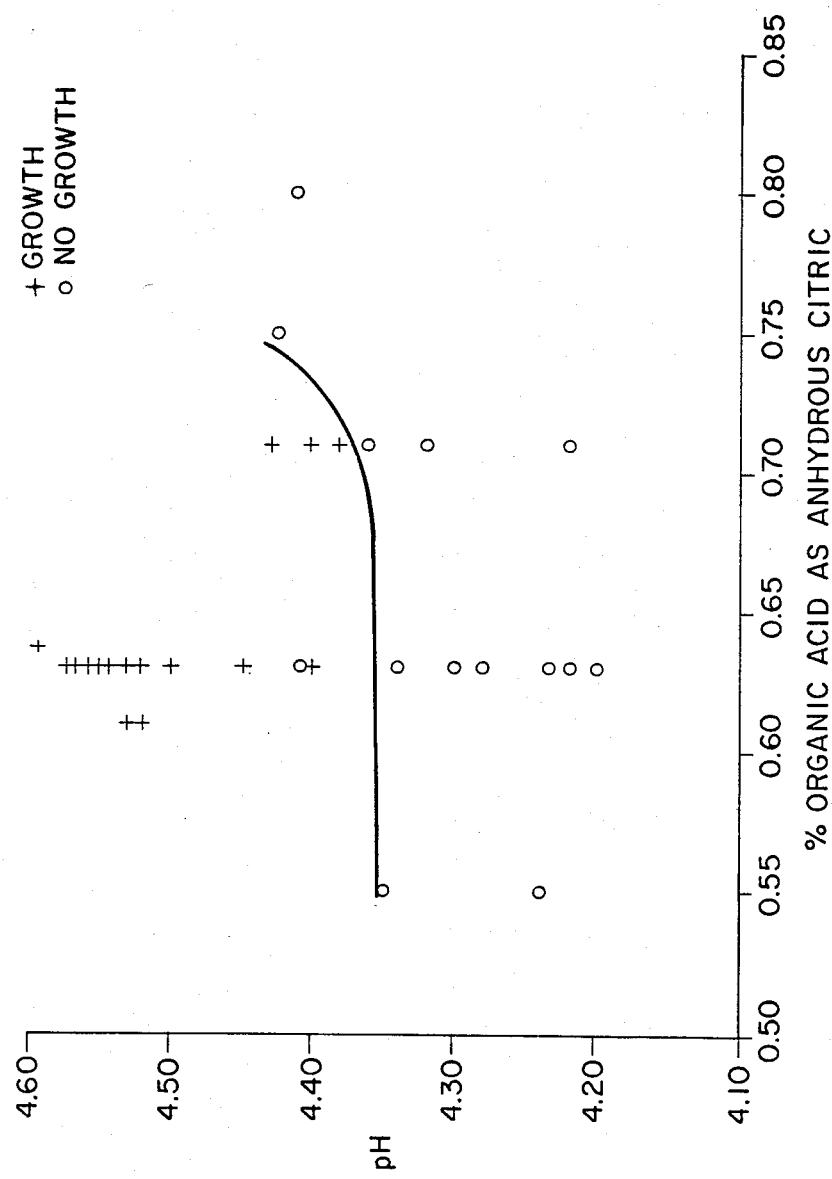

STERILIZATION AND STABILIZATION PROCESS FOR MEAT ANALOG PRODUCTS

RELATED APPLICATION

This is a continuation-in-part application of Ser. No. 500,699, filed June 3, 1983, now abandoned.

Technical Field

This invention relates to an improved process for sterilizing and rendering shelf-stable food products containing meat or meat analog which prevents the development of off flavors and bacterial spoilage.

BACKGROUND OF THE INVENTION

A variety of food products containing meat are readily adaptable to replacement of their normal meat constituents with textured vegetable protein. These foods include low-acid tomato-based sauces such as spaghetti sauce, taco, chili mixes, etc. Many of these are low-acid foods and can be stabilized to prevent spoilage due to growth of microorganisms. Purely thermal sterilization leads to loss in flavor acceptability due to the development in the product of burned and browned flavors, as well as thermal reaction product off flavors.

By acidification of such products to a pH of 4.6 or below, the products are rendered microbiologically safe if the products are sealed into containers at elevated temperatures, and held for sufficient time to destroy molds, yeasts, and vegetative bacteria prior to cooling. Safety concerns aside, most acidified foods are kept at a pH well below 4.6, because above about 4.2, growth of *Bacillus coagulans* occurs, causing flat sour spoilage of the product.

The federal regulations (Food and Drug Administration) permit canners of low-acid foods to acidify their products to a pH of 4.6 or below to prevent the occurrence of botulism.

Rice et al, in a journal paper from the New York State Agricultural Experiment Station (1953), state that increases in citrate level produced proportionate increases in the minimum pH at which strains of *Bacillus coagulans* are able to germinate and grow. Ashton et al., in *Abstracts of the Annual Meeting*—1977 *of the American Society for Microbiology*, state that titratable acidity proved to be a highly reliable index of microbial stability in hot-fill acid foods. Products with titratable acidities greater than 0.5% as acetic acid conferred shelf stability.

Sognefest et al, *Food Technology*, 1(1), 78 (1947), describe a method of canning tomato juice and tomato juice cocktail at a pH below 4.5 which employs high-temperature short-time processing in a heat exchanger prior to filling in cans.

When meat analog is added to low acid food, e.g. spaghetti sauce, the analog acts as a buffer and raises the pH of the sauce. The high protein and fat content as well as the available water provides a fertile growth medium for bacteria. This also holds true for low acid sauces containing meat or poultry.

It has now been discovered that at a pH of about 4.4, or lower, textured vegetable protein present in low acid food products acquires a sharp, sour, astringent flavor, presumably due to some chemical change in the material at this pH. Clearly, it is desirable to have a process for sterilization of low-acid food products containing significant amounts of textured vegetable protein (meat analog) which rigorously protects product safety, while having minimal impact on product flavor.

It has also been discovered that the presence of meat analog in low acid food products has the unexpected effect of causing increased susceptibility to flat sour spoilage by *Bacillus coagulans* at pH levels that are usually safe from spoilage. For example, spaghetti sauce without meat analog at pH 4.2 did not spoil after inoculation with *B. coagulans* spores, while sauce containing analog showed spoilage. Hence, it is also desirable to provide a process for sterilization of low-acid food products containing meat analog which solves this unexpected spoilage problem caused by the presence of analog.

It is an object of this invention therefore to provide a process which renders a food product containing high levels of textured vegetable protein bacteriologically safe and shelf-stable and which operates in a zone of pH (4.2 to 4.6).

It is a further object of this invention to provide a process for sterilizing low acid foods containing at least 7% meat or poultry.

This and other objects will become obvious from reading the disclosure provided herein.

All percentages are by weight unless otherwise indicated.

DESCRIPTION OF THE FIGURES

FIG. 1 is a graph of a meat analog-containing spaghetti sauce showing the growth of organisms as a function of pH and percent organic acid expressed as anhydrous citric acid. A plus indicates growth of microorganisms. A zero indicates no growth. The area below the curve is an area of stability for this particular product. Other products made from ingredients with higher or lower levels of contamination with spores of spoilage bacteria have different pH boundaries between spoilage and stability but the general relationship of pH and organic acid level holds true.

DISCLOSURE OF THE INVENTION

This invention is a process for preventing bacteriological spoilage in acidified foods containing meat or textured vegetable protein while maintaining the flavor of the product. This process involves acidifying the food product to a pH of 4.6 or less; maintaining an organic acid level of at least about 0.4% (based on anhydrous citric acid equivalency), subjecting the food product to high-temperature-short-time processing, and packing the food product using hot-fill-and-hold techniques. More specifically, this invention provides a process for preventing spoilage in an acidified food product containing meat or textured vegetable protein while maintaining flavor quality, comprising the steps of:

(a) acidifying the food product to a pH of from about 4.2 to about 4.6 and to an organic acid level of from about 0.4% to about 0.75% (expressed as anhydrous citric acid as determined by titration of ingredients and direct addition of acids as described on page 5 of this specification);

(b) sterilizing the food product using high-temperature-short-time processing to a $F_0$ of at least about 0.3;

(c) packing the product at a temperature of from about 85° C. (185° F.) to 100° C. (212° F.);

(d) hermetically sealing the packed product; and (e) holding the packed, sealed product at a temperature of at least about 85° C. (185° F.), for at least about 3 minutes.

Only the combination of all parts of this process provides product safety, flavor quality, and prevention of spoilage on storage.

This process is useful for low acid foods containing textured vegetable proteins, meat analogs, meat and/or poultry. This process is particularly applicable to tomato sauce products, e.g. spaghetti sauce, parmesan sauce, salisbury steak sauce, chili. It can also be used on protein food products, in a gravy or cream-based sauce, e.g. stroganoff, cheese sauces, etc.

The meat analog or textured vegetable protein can be made from any protein source. The terms "meat analog" and "textured vegetable protein" are used interchangeably herein to mean textured protein resembling meat particles. Preferred for use herein are the vegetable protein sources such as soybean, wheat, cottonseed, sunflower seed, and corn. Other protein sources such as single cell proteins, fish meal, keratin, algae and kelp can also be used to make the meat analogs herein.

The meat analog can contain up to 50% by weight of meat or meat by-products, including chicken, turkey, beef, and pork. The meat analog can contain meat flavors, spices, fat, synthetic fat, animal tissue and other materials which make it more "meat-like".

The meat analog will usually be present in the food product at levels of about 5% to about 70% by weight; preferably about 10% to 25% meat analog is used in most tomato-based sauces. Meat analog, as noted previously acquires an astringent taste in acid foods. This astringency is not exhibited by meat or poultry in most foods. However, meat can be used in the process of this invention at levels of about 6% to about 25% by weight of the finished product.

For lower levels of meat, the high organic acid level and pH adjustment may not be necessary.

DESCRIPTION OF THE PREFERRED EMBODIMENTS

Acidification

The process of this invention requires acidifying the product to a pH of from about 4.2 to about 4.6, and preferably from about 4.3 to about 4.6. As stated above, federal regulations, in particular 21 C.F.R. part 114 requires canners of low-acid foods to acidify their products to a pH of 4.6, or below, to prevent the occurrence of botulism. This is an alternative to retort sterilization. The pH can be determined by measurement of the hydrogen ion concentration with a pH meter, using the methodology defined in 21 C.F.R. §114.90.

However, it has been determined that keeping the pH between 4.2 and 4.6, while effective to prevent development of *Clostridium botulinum*, is insufficient to prevent development of flat sour spoilage, caused by activity of *Bacillus coagulans*. In addition to the other process steps recited herein, it has been determined that, in addition to acidification to a particular pH range, a particular organic acid level is required for control of the latter microorganism. An organic acid level from about 0.4% to about 0.75% organic acid expressed as anhydrous citric acid, and preferably about 0.45% to about 0.6%, is required for long term shelf stability. For the purposes of this patent, the organic acid level in the ingredients was determined by titratable acidity of the freshly prepared tomato-based sauce, i.e. before addition of meat or meat analog chunks. In general, the sauce sample is diluted and titrated with 0.1N sodium hydroxide to a pH of 8.1. The titratable acidity is expressed as percent anhydrous citric acid. The finished product organic acid level is the sum of the sauce titratable acidity and the quantity of organic acids added in the acidification of the meat analog and finished product.

In general, any food compatible acid, or combination of food compatible organic and inorganic acids, is acceptable for lowering the pH. Edible organic acids which can be used herein include fumaric, citric, malic, acetic, lactic, propanoic, adipic, tartaric, succinic and the like. A certain level of inorganic acids may also be used for lowering the pH. These acids are not counted in the organic acid level. These include phosphoric, carbonic, sodium hydrogen phosphate, and hydrochloric acid. Within the pH limit and the organic acid level, certain acids and combination of acids will provide more acceptable flavor, depending upon the product being formulated. For example, acidification with citric acid provides more sourness and sharpness than acidification with hydrochloric acid at a given pH. Acetic acid can add a vinegary flavor to foods. Preferably the organic acid level will comprise about 0.3% citric acid and about 0.1% lactic acid.

Sterilization Processing

The food product is subjected to high-temperature-short-time (HTST) processing to achieve a sterilizing value, $F_0$, of at least about 0.3. Preferably the sterilizing value is 0.7, and most preferably 1.8. HTST processing is a technique commercially used for pre-sterilization of canned tomato juice and similar beverages. The procedure was developed to provide a means of destroying acid-tolerant, heat-resistant spoilage organisms which could not be destroyed by conventional processes without a severe loss in the flavor and quality of the tomato product. The process relies upon two principles: first, the increase in rate of heat penetration effected in high efficiency heat exchangers decreases the processing time needed to heat the product to a given temperature. Second, the use of a high processing temperature for a short time reduces the degree of chemical change in the product for a given sterilization value.

Coil, plate, and tubular heat exchangers have all been used in HTST processing. Certain conditions should be considered in judging the merits of a particular type of equipment, such as the thermal efficiency, ease of cleaning of the heat exchanger surfaces, and available means of automatic control of HTST times and temperatures. A swept wall heat exchanger is preferred for use herein. The clearance of the scrapers should be such that the particle size of the meat analog and/or meat is not significantly reduced.

The heat exchanger must be designed to withstand the pressures necessary to pump the required amount of product through the equipment, as well as being capable of heating the product to the sterilizing temperature. The pressure throughout the heat exchanger should exceed the pressure of saturated steam at the maximum temperature in the heater, to avoid boiling within the heat exchanger, which reduces heat transfer efficiency. The pump used must maintain a positive, constant flow rate against the pressures necessary to force the product through the heat exchanger. This is especially important because flow rate through the heat exchanger will determine the time-temperature exposure of the product. Preferably, the HTST equipment is operated under automated control to maintain the desired sterilizing times and temperatures.

Any commercial HTST system can be used. Units such as those available in the U.S. from Crepaco, Inc. and Cherry Burrell Corp., and from Alfa-Laval De-Laval of Sweden are useful herein.

The sterilizing value, $F_0$, for a particular HTST process is the time exposure in minutes at 250° F. (121.1° C.) to which the particular time-temperature exposure of the HTST process is equivalent. The equivalence can be determined by examination of thermal death time curves for resistant spore-forming bacteria in the product being sterilized.

A thermal death curve is determined by plotting on semilog paper survival and destruction times in minutes on the logarithmic scale against temperature in degress F on the linear scale. The best straight line above the survival points and below the destruction points is the thermal death time curve. From the thermal death time curve, or an extension thereof, thermal death times for temperatures not listed can be estimated. The slope of the line, after certain corrections, is termed the z value, and is the interval in temperature (degrees Fahrenheit), required for the curve to pass through one logarithmic cycle on semi-logarithmic paper. In other words, z represents the degrees Fahrenheit increase required to change the thermal death time tenfold. The z value represents change in thermal death time with change in temperature. F is the time in minutes required to destroy a given number of organisms in the medium at a specific temperature. F values should not be compared unless the z values are the same. The symbol $F_0$ is used to express the F value when z=18 and the temperature is 250° F. (121.1° C.). The z values of most of the more heat-resistant spore-forming bacteria, and hence those important in the practice of this invention, often approximate 18, and therefore this value is used for calculating processing times.

Preferably, thermal death times are determined and thermal death curves are constructed for the specific food product for which this invention is desired to be used. These times can be determined using techniques readily familiar to the field of microbiology in general, and food microbiology in particular. For example, reference may be had to *Laboratory Manual for Food Canners and Processors*, Vol. 1, (Microbiology and Processing) (AVI Pub. Co., Westport, Conn., 1968), a standard reference in the field, the disclosures of which are hereby incorporated herein by reference, for a full explanation of the procedures involved.

Once thermal death curves are obtained, processing times and temperatures can be selected to provide a sterilizing value that is based on the expected spore load of the product and the nature of the microbial contamination.

A sterilizing value $F_0$ of about 0.3 or greater will assure protection against spoilage for a product at low contamination levels of at least about 12 months. A sterilizing value $F_0$ of about 0.7 or greater will provide protection under essentially all conditions. A sterilizing value $F_0$ of about 1.8 or greater will, in addition to protecting against spoilage, provide redundant protection against botulism by destroying *C. botulinum* independent of acidification.

Generally, an F value equivalent to a 4D (99.99%) reduction in *B. coagulans* spores is considered satisfactory for spoilage stability of acidified products made from ingredients having a low load of spores (light contamination). For products made under conditions where much higher levels of spore contamination is possible, a suitable F value may embody as high as a 10D sterilization process.

The term D is used to define the time at a specific temperature required for a 1 log (90%) reduction in numbers of viable spores and is termed the "death rate constant" or "decimal reduction time".

The D value is determined by plotting on semilog paper, the number of surviving organisms on the logarithmic scale against time in minutes on the linear scale, and the best straight line is drawn through them. The D value is the time in minutes required for this curve to traverse one logarithmic cycle. A subscript denotes the temperature to which D relates. For example, $D_{250}$ refers to the death rate at 250° F., while $D_{212}$ refers to the death rate at 212° F.

*B. coagulans* $D_{250}$ values ranging from 0.01 to 0.07 have been reported in the literature. For example, Stumbo, C. R., *Thermobacteriology in Food Processing*, Academic Press, New York, N.Y., 1965, p. 99. Therefore, a 4D process would be represented by an $F_0$ of about 0.3.

Similarly, a 12D $F_0$ is customarially used for *C. botulinum*. In products of the type covered by this invention a $D_{250}=0.15$ has been found experimentally. Thus a 12D process would be described by $F_0=1.8$.

In a preferred embodiment of this invention, the product is held at a temperature just high enough to prevent microbial growth (60° C., 140° F.) prior to HTST processing so that thermal degradation of the product is minimized. The HTST process then serves to cook the product as well as sterilize it.

In practice, the HTST method consists of heating the product rapidly and continuously to a temperature of about 104° C. (220° F.) to about 137° C. (280° F.) in a heat exchanger for a time appropriate to achieve sterilization. In general, about 5 seconds to about 60 seconds time is sufficient at temperatures from about 118° C. (245° F.) to about 137° C. (280° F.) to sterilize the product. The product is rapidly cooled to a temperature below its boiling point before filling into containers. The rapid cooling is done by flashing the steam off through release of pressure or by passing the food product through a heat exchanger at temperatures below about 49° C. (120° F.) so that the product temperature is below about 100° C. (212° F.) but above about 88° C. (190° F.).

Packing

In the sterilization process of this invention, the textured vegetable protein-containing food products are packed in hermetically sealed containers by hot-fill-and-hold techniques. While "hermetically sealed containers" is usually used to refer to jars and cans, it can be appreciated that newer aseptic packages, such as plastic and foil-plastic laminate pouches can also be adapted to this process. In hot-fill-and-hold processing, the container is filled with product at a temperature of at least about 85° C. (185° F.) to about 100° C. (212° F.) and held for about 2 minutes to 5 minutes, preferably about 3 minutes before cooling. Microbial destruction is a function of both product temperature and the time at that temperature, and it is known in the art that different combinations of time and temperature can be used to provide the same thermal equivalence. In the hot-fill-and-hold process, it is extremely important to assure this high closing temperature for each and every container.

Without a high closing temperature, the temperature of the product prior to closing may drop below temperatures which are effective to sterilize any vegetative bacteria, yeasts and molds on the inner surfaces of the container. Therefore, time between container filling and container sealing is preferably minimized. In the event the process is stopped, such as by equipment breakdown, containers in transit between filling and sealing operations will probably cool excessively and will need to be reprocessed, reheated, or scrapped.

After the container is sealed, it is important that portions of the container not contacted by product be heated to the same temperature as the product. For example, if jars are filled with product, a post-capping hot water spray directed at the lid and headspace of the jar can be used to provide for lid and headspace heating. Alternatively, the jars can be inverted after filling and capping for the desired hold time, to provide for lid and headspace sterilization.

The product is then cooled to storage temperature.

The following examples illustrate the process described herein.

EXAMPLE 1

A spaghetti sauce containing meat analog was prepared according to the following formula:

| | |
|---|---|
| Tomato paste (25% solids) | 33.6% |
| Sugar | 1.5 |
| Salt | 1.0 |
| Onions and garlic | 1.3 |
| Citric acid | 0.1 |
| Spices and flavor | 1.3 |
| Textured vegetable protein analog (dry) | 7.4 |
| Water | 4.7 |
| Crisco Oil* | 3.9 |
| Cheese | 0.2 |
| | 100.00 |

*Crisco Oil is a vegetable oil sold by The Proctor & Gamble Company

The sauce ingredients were heated in a 50-gallon Hamilton kettle with a steam-heated jacket to 93° C. (200° F.) over a period of about 15 minutes. The meat analog was added and the temperature raised again to 93° C. (200° F.). The product was cooked at 93° C. (200° F.) for 15 minutes, filled into 32-ounce jars, and capped. The jars were inverted and held above 82° C. (180° F.) for 3 minutes and then cooled. The ingredients were tested and found to contain *Bacillus coagulans* spores at a level so as to provide approximately 500 spores per gram of product. The final product pH was 4.54 and the organic acid level calculated as anhydrous citric acid was 0.63%. The jars were incubated and held at 27°-32° C. (80°-90° F.) for 15 days and examined microbiologically. Evidence of microbial spoilage, e.g. lowered product pH or off odor, were found. Viable spore-forming organisms of the *B. coagulans* type were found on microscopic examination and streaking on thermoacidurans agar.

EXAMPLE 2

Part of the jarred product in Example 1 was thermally processed in a retort (at 104° C. [220° F.] for 120 minutes) to an $F_0=0.5$ and incubated at 21° C. (70° F.) for 19 months. Product flavor was "cooked" and unacceptable but no microbial spoilage took place.

EXAMPLE 3

Product prepared according to the formula and process described in Example 1 was thermally processed by passing through a Crepaco VT460 swept surface heat exchanger to achieve high temperature short time (HTST) sterilization. The product was preheated to 91° C. (195° F.). The temperature was raised to 123° C. (254° F.) in the first heat exchanger, held for 14 seconds, and cooled in a second heat exchanger to 92° C. (197° F.) for an $F_0=0.38$ process. Sixty jars were filled, capped, inverted, cooled and stored at 38° C. (100° F.) for 12 months without microbial spoilage. The flavor of the analog was good.

As is evident from these examples, pH and organic acid level are not enough to maintain sterility in the product. Retort insures microbial stability, but causes a cooked flavor because of the high temperature and time involved.

EXAMPLE 4

Product prepared according to the formula and process described in Example 1 was adjusted to pH 4.30 with 0.356% citric acid monohydrate (for an organic acid level of 0.956%) and filled into jars at between 32°-93° C. (90°-200° F.), capped, inverted for 5 minutes and cooked. A second batch of the same product was prepared but the pH was 4.56 and an organic acid level of 0.63%. Sixty jars of each batch were aged at 38° C. (100° F.) for 12 months. The product at pH 4.56 had microbial spoilage of the flat sour type in 8 weeks. The pH 4.30 product was free of microbial spoilage after one year of aging, but the analog flavor was sour and unacceptable.

EXAMPLE 5

A spaghetti sauce containing meat analog was prepared according to the following formula:

| | Percent |
|---|---|
| Tomato paste (25% solids) | 25.5 |
| Sugar | 1.76 |
| Salt | 0.94 |
| Onions and garlic | 1.23 |
| Citric acid | 0.09 |
| Spices and flavor | 1.17 |
| Textured vegetable protein analog (dry) | 7.02 |
| Crisco Oil | 4.68 |
| Starch | 0.185 |
| Water | 57.4 |
| | 99.98 |

Two batches, A and B, were made as described in Example 1, and to batch B additional flavor was added including lactic acid. Both products were adjusted to pH 4.43 but the calculated organic acid level in batch A was 0.70% and batch B 0.80%. Twenty one jars of batch A and 15 jars of batch B were aged at temperatures ranging from 27° to 38° C. (80° to 100° F.) for 6 to 7 months and examined. Batch A contained jars with microbial spoilage while batch B was unspoiled. Both had an unacceptable sour flavor when freshly made.

This demonstrates that the organic acid can be increased to a level where a stable product can be made without HTST even though at a pH where microbial spoilage would normally occur. However, the added acid imparts to the product an excessively sour taste even though the pH is within the acceptable range for analog taste.

EXAMPLE 6

A spaghetti sauce was prepared according to the following formula:

|  | Percent |
| --- | --- |
| Tomato paste | 30 |
| Tomato | 14 |
| Vegetable oil | 3.1 |
| Sugar | 1.9 |
| Salt | 1.4 |
| Dried vegetables | 0.85 |
| Spices | 0.19 |
| Water | 48.56 |
|  | 100.00 |

To one portion, designated A, NaOH solution was added to raise the pH to 4.2. To a second portion, designated B, 17% analog on a final product basis and HCl was added to establish an equilibrium pH of 4.2.

Both products A and B were heated to 190° F. in 15½-ounce jars, inoculated with 0.2% of onion powder known to contain a high concentration of spores of spoilage bacteria, sealed with lids, held at 190° F. for 20 minutes, and cooled with water spray to less than 110° F. Both products were placed at 100° F. and examined weekly for evidence of spoilage. Product A remained stable while Product B spoiled rapidly as evidenced by increased acidity.

This demonstrates that the presence of textured vegetable protein renders spaghetti sauce more susceptible to spoilage.

What is claimed is:

1. A process for preventing spoilage while maintaining flavor quality in a low-acid food product containing textured vegetable protein, comprising the steps of:
   (a) acidifying the food product to a pH of from about 4.2 to about 4.6 and an organic acid level of about 0.4% to about 0.75%;
   (b) high temperature short-time sterilizing the food product to a $F_0$ of at least about 0.3;
   (c) then packing the product at a temperature of from about 85° C. (185° F.) to 100° C. (212° F.);
   (d) then hermetically sealing the product; and
   (e) then holding the packed, sealed product at a temperature of at least about 85° C. (185° F.) for a time of at least about 3 minutes.

2. A process according to claim 1 in which the food product is acidified to an organic level of about 0.45% to about 0.6%.

3. A process according to claim 2 in which the food product is sterilized to a value $F_0$ of at least about 0.7.

4. A process according to claim 3, in which the food product is sterilized to a sterilizing value $F_0$ of at least about 1.8.

5. A process according to claim 3 in which the food product is acidified to a pH of between about 4.3 and 4.6.

6. A process according to claim 5 wherein the food product contains from about 5% to about 70% textured vegetable protein.

7. A process according to claim 6 wherein the food product comprises a tomato-based sauce.

8. A process according to claim 7 wherein the food product is acidified with an organic acid selected from the group consisting of citric acid, lactic acid, malic acid and mixtures thereof.

9. A process according to claim 8 wherein the organic acid comprises about 0.3% citric acid and about 0.1% lactic acid.

10. A process according to claim 8 wherein the textured vegetable protein contains up to 50% by weight of meat or meat by-products.

* * * * *

UNITED STATES PATENT AND TRADEMARK OFFICE
CERTIFICATE OF CORRECTION

PATENT NO. : 4,539,212
DATED : September 3, 1985
INVENTOR(S) : John E. Hunter

It is certified that error appears in the above-identified patent and that said Letters Patent are hereby corrected as shown below:

On the cover page, "The Proctor & Gamble Company" should read -- The Procter & Gamble Company -- .

Col. 5, line 16, "degress" should read -- degrees -- .

Col. 8, line 24, "cooked" should read -- cooled -- .

Signed and Sealed this

Tenth Day of December 1985

[SEAL]

*Attest:*

*Attesting Officer*

DONALD J. QUIGG

*Commissioner of Patents and Trademarks*